United States Patent
Bianchini et al.

(10) Patent No.: US 11,264,638 B2
(45) Date of Patent: Mar. 1, 2022

(54) INCREASING GRAVIMETRIC CAPACITY IN BATTERIES

(71) Applicant: The Regents of the University of California, Oakland, CA (US)

(72) Inventors: Matteo Bianchini, Karlsruhe (DE); Gerbrand Ceder, Orinda, CA (US)

(73) Assignee: The Regents of the University of California, Oakland, CA (US)

( * ) Notice: Subject to any disclaimer, the term of this patent is extended or adjusted under 35 U.S.C. 154(b) by 206 days.

(21) Appl. No.: 16/498,339

(22) PCT Filed: Feb. 5, 2018

(86) PCT No.: PCT/US2018/016887
§ 371 (c)(1),
(2) Date: Sep. 26, 2019

(87) PCT Pub. No.: WO2018/182851
PCT Pub. Date: Oct. 4, 2018

(65) Prior Publication Data
US 2020/0112048 A1    Apr. 9, 2020

Related U.S. Application Data

(60) Provisional application No. 62/478,544, filed on Mar. 29, 2017.

(51) Int. Cl.
H01M 10/054 (2010.01)
H01M 4/58 (2010.01)
H01M 10/44 (2006.01)

(52) U.S. Cl.
CPC ....... H01M 10/054 (2013.01); H01M 4/5825 (2013.01); H01M 10/44 (2013.01)

(58) Field of Classification Search
None
See application file for complete search history.

(56) References Cited

U.S. PATENT DOCUMENTS

| | | | |
|---|---|---|---|
| 2014/0234700 A1* | 8/2014 | Moriwaka | H01M 4/587 429/199 |
| 2014/0308579 A1* | 10/2014 | Kojima | H01M 4/366 429/199 |
| 2016/0064734 A1* | 3/2016 | Li | C01G 53/42 252/182.1 |

OTHER PUBLICATIONS

Le Meins, Ionic conductivity of crystalline and amorphous Na3Al2(PO4)2F3, 1998, Solid state ionics, 111, 67-75, (Year: 1998).*

Serras, High voltage cathode materials for Na-ion batteries of general formula Na3V2O2x(PO4)2F3-2x, 2012, 22, 22301-22308 (Year: 2012).*

(Continued)

*Primary Examiner* — Daniel S Gatewood
(74) *Attorney, Agent, or Firm* — Gavrilovich, Dodd & Lindsey LLP (57) ABSTRACT

A sodium-ion battery includes an electrode having a crystalline active material represented by formula units that intercalate and/or deintercalate more than two charge carriers during operation of the battery. In some instances, the active material that experiences a volume change of less than 6.0%, 4.0%, or even 2.0% when the active material intercalates more than two charge carriers during operation of the battery.

19 Claims, 9 Drawing Sheets

(56) References Cited

OTHER PUBLICATIONS

Nickitas-Etienne, Athina, International Preliminary Report on Patentability and Written Opinion, PCT/US2018/016887, The International Bureau of WIPO, dated Oct. 10, 2019.
Bianchini et al., "Additional Sodium Insertion Into Polyanionic Cathodes for Higher-Energy Na-Ion Batteries", vol. 7, Issue 8, May 16, 2017, retrieved from the Internet: <URL: https://onlinelibrary.wiley.com/doi/abs/101002/aenm.201700514>, abstract.
Copenheaver, Blaine R., International Search Report and Written Opinion, PCT/US2018/016887, United States Patent and Trademark Office, dated Apr. 24, 2018.
Le Meins et al., Ionic Conductivity of Crystalline and Amorphous (Na3Al2(PO4)2F3, Solid State Ionics, vol. 111, 1998, pp. 67-75.

* cited by examiner

INCREASING GRAVIMETRIC CAPACITY IN BATTERIES

RELATED APPLICATIONS

This application is a U.S. National Stage Application filed under 35 U.S.C. § 371 and claims priority from International Application No. PCT/US2018/016887, filed Feb. 5, 2018, which application claims the benefit of U.S. Provisional Patent Application Ser. No. 62/478,544, filed Mar. 29, 2017, the disclosures of which are incorporated herein in their entirety by reference.

FIELD

The present invention relates to batteries and more particularly to alternatives to lithium ion batteries.

BACKGROUND

Lithium-ion batteries have become a leading technology for energy storage in portable and automotive applications. Other battery technologies have also been developed as alternatives to lithium-ion batteries. Sodium-ion batteries are an example of an alternative that uses sodium ions as charge carriers rather than lithium ions. Since sodium is more abundant than lithium, these batteries may be cheaper to produce than lithium-ion batteries. However, the adoption of sodium-ion batteries has been limited by an undesirably low gravimetric capacity and/or gravimetric energy density. As a result, there is a need for improved alternatives to lithium-ion batteries.

SUMMARY

A sodium-ion battery includes an electrode having a crystalline active material represented by formula units that intercalate and/or deintercalate more than two charge carriers during operation of the battery. In some instances, the active material experiences a volume change of less than 6.0%, 4.0%, or even 2.0% when intercalating more than two charge carriers during operation of the battery.

In some instances, the active material includes octahedral structures that share a common atom. The formula units each include multiple screening ions. Each of the screening ions is included in one of the octahedral structures at a vertex opposite from the common atom. An axis extends between the screening ions included in one of the formula units. More than three sodium charge carriers are located between the octahedral structures and around the axis. In some instances, at least one of the screening ions is an oxygen ion and/or at least one of the octahedral structures includes a central atom that is selected from a group consisting of metals and metalloid cations but is not vanadium.

In one embodiment, a sodium-ion battery includes an electrode having an active material represented by $Na_xV_{2-z}Q_z(PO_4)_2F_{3-2y}O_{2y}$, wherein Q does not represent vanadium and is one or more components selected from a group consisting of redox-active metal cations and metalloid cations; $3 \leq x \leq 4$; $0 \leq y \leq 1$; $0 \leq z \leq 2$; when y is 0, z is $>0$ and when z is 0, x is $>3$.

In one embodiment, a sodium-ion battery is included in a system having electronics for controlling the discharge of the battery such that the battery is discharged to a voltage less than 2.0 V or less than 1.8 V.

In one embodiment, a sodium-ion battery has a positive electrode with a positive active material having an energy density greater than 500 Wh/kg. In some instances, the energy density is 500 Wh/kg-600 Wh/kg.

BRIEF DESCRIPTION OF THE FIGURES

FIG. 1A and FIG. 1B illustrate a negative electrode of a battery.

FIG. 2A and FIG. 2B illustrate a positive electrode.

DESCRIPTION

As used herein and in the appended claims, the singular forms "a," "an," and "the" include plural referents unless the context clearly dictates otherwise. Thus, for example, reference to "a sodium ion" includes a plurality of sodium ions and reference to "the electrode material" includes reference to one or more electrode materials and equivalents thereof known to those skilled in the art, and so forth.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting."

Unless defined otherwise, all technical and scientific terms used herein have the same meaning as commonly understood to one of ordinary skill in the art to which this disclosure belongs. Although any methods and reagents similar or equivalent to those described herein can be used in the practice of the disclosed methods and compositions, the exemplary methods and materials are now described.

All publications mentioned herein are incorporated herein by reference in full for the purpose of describing and disclosing the methodologies, which are described in the publications, which might be used in connection with the description herein. With respect to any term that is presented in one or more publications that is similar to, or identical with, a term that has been expressly defined in this disclosure, the definition of the term as expressly provided in this disclosure will control in all respects.

A battery includes an electrode with an active medium into which charge carriers intercalate and/or from which the charge carriers deintercalate during operation of the battery. The active medium includes a crystalline active material represented by formula units that intercalate and/or deintercalate an average of more than two charge carriers during operation of the battery. This ability to intercalate more than two charge carriers from the electrode increases the gravimetric capacity and/or gravimetric energy density of the battery. For instance, the disclosed active material can have a theoretical energy density approaching in a range of 500 Wh/kg to 600 Wh/kg.

In some instances, the active material has at least two octahedral structures that each includes a screening ion. Additionally, the active material includes three or more charge carrier sites between the octahedral structures and around an axis that extends between the screening ions. An example active material has formula units represented by $Na_xV_{2-z}Q_z(PO_4)_2F_{3-2y}O_{2y}$, wherein Q is one or more components selected from a group consisting of metal cations and metalloid cations other than vanadium, $3 \leq x \leq 4$, $0 \leq y \leq 1$, $0 \leq z \leq 2$. When y is 0, z is >0 and when z is 0, x is >3.

In batteries, strong ordering and electrostatic repulsion between charge carriers in the active material increases barriers to the mobility of the charge carriers. The inventors have found that using an oxygen anion ($O^{2-}$) as one or more of the screening ions can increase screening of repulsive Coulombic interactions among the charge carriers. Without being bound to theory, this screening effect is believed to weaken the electrostatic repulsion between the charge carriers and increase the mobility of the charge carriers. The increased mobility is believed to permit more than two charge carriers to deintercalate from and/or into the active material during the operation of the battery.

The inventors have also found that substituting one or more metal or metalloid cations for vanadium as the central atom of one or more of the octahedral structures can also disrupt the ordering of charge carriers in the active medium. This disruption of the ordering is also believed to increase charge carrier mobility enough to permit more than two charge carriers to deintercalate from and/or into the active material during the operation of the battery.

Additionally, the disclosed active materials have shown a surprisingly low volume change during operation of the battery. For instance, the active material has shown a volume change that is less than 6.0%, 4.0% or even 2.0% when the formula units intercalate an average of at least three charge carriers and/or when the formula units deintercalate an average of at least three charge carriers. As an example, $Na_4V_2(PO_4)_2FO_2$ shows a volume change of 1.7% when deintercalating three sodium charge carriers to become $NaV_2(PO_4)_2FO_2$. This level of volume change reduces cracking of the active medium and/or separation of the positive active medium from the positive current collector during operation of the battery. Accordingly, the disclosed positive active medium can prevent damage that can shorten battery life.

Figure 1A:
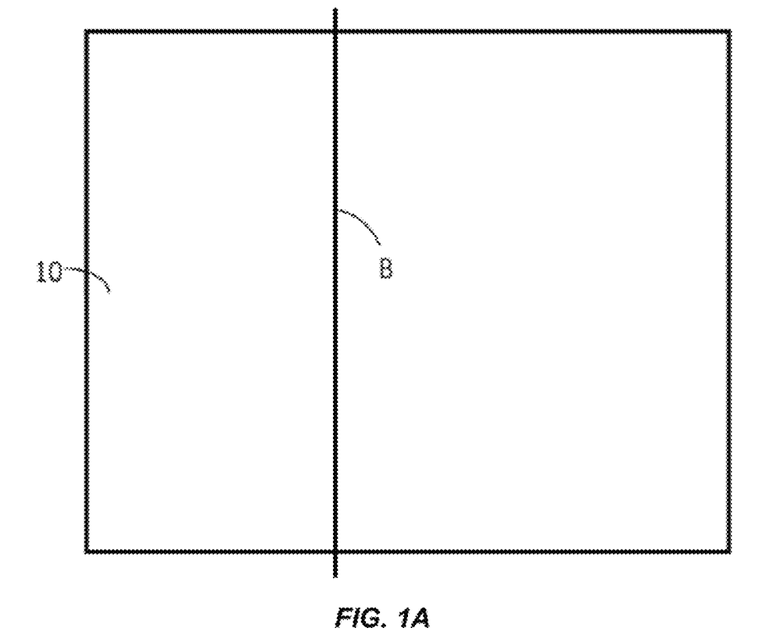
FIG. 1A is a sideview of the negative electrode.
Figure 1B:
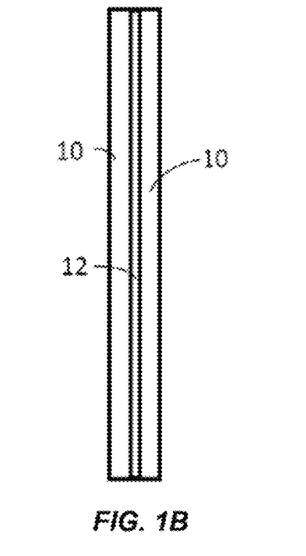
FIG. 1B is a cross section of the negative electrode taken along the line labeled B in FIG. 1A.

FIG. 1A and FIG. 1B illustrate a negative electrode for use in a battery. FIG. 1A is a sideview of the negative electrode. FIG. 1B is a cross section of the negative electrode taken along the line labeled B in FIG. 1A. The negative electrode includes a negative active medium 10 on both faces of a negative current collector 12. The negative active medium 10 includes or consists of one or more negative active materials. The negative current collector 12 is configured to provide an electrical pathway between the negative active medium 10 and the terminals of an electrochemical device. Although the negative active medium 10 is shown positioned on both faces of the negative current collector 12, the negative active medium 10 can be positioned on only one face of the negative current collector 12. As will be discussed below, in some instances, the negative electrode includes a carrier layer (not illustrated). The disclosed battery can be a primary or a secondary battery. As a result, the negative electrode can be an anode of a primary battery or a secondary battery.

Suitable negative current collectors 12 include, but are not limited to, Al, Cu, and steel. Suitable negative current collectors 12 include, but are not limited to, a foil, a net, a mesh, or a plate.

The negative active medium 10 can include or consist of one or more negative active materials. Suitable negative active materials include, but are not limited to, carbon, graphite, and sodium metal.

The negative medium can optionally include one or more components selected from the group consisting of one or more binders, one or more conductors and one or more diluents. Examples of suitable binders include, but are not limited to, polytetrafluoroethylene (PTFE), polyvinylidene fluoride (PVDF), and sodium polyacrylate. Examples of suitable conductors include, but are not limited to, carbon. Examples of suitable diluents include, but are not limited to, water and NMP. As will be discussed below, in some instances, the negative medium includes charge carrier in addition to the one or more active materials, any binders, any conductors and/or any diluents.

The negative electrode or cathode can be generated by forming a slurry that includes the components of the negative medium and a solvent. The slurry is coated on one side the negative current collector 12 or on both sides of the negative current collector 12. The solvent can then be evaporated from the slurry so as to leave the negative medium on the current collector. The negative electrode can be cut out of the result.

In some instances, the negative electrode excludes the negative current collector 12. For instance, the negative medium can also serve as the negative current collector.

Figure 2A:
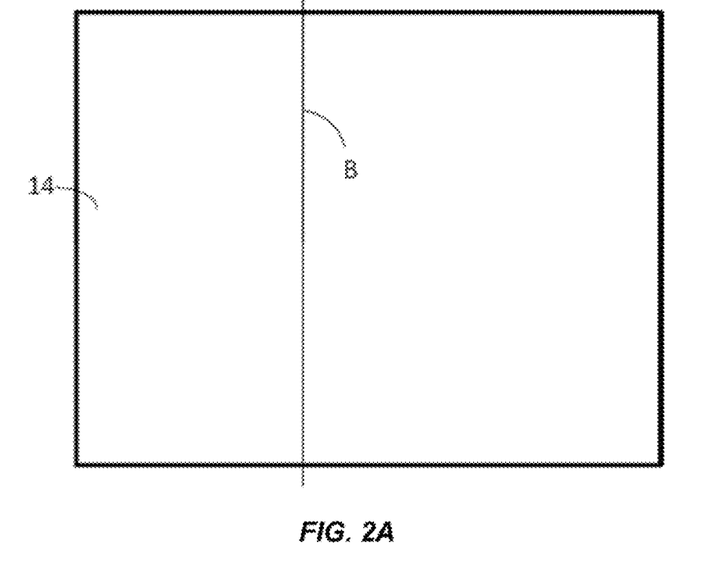
FIG. 2A is a sideview of the positive electrode.
Figure 2B:
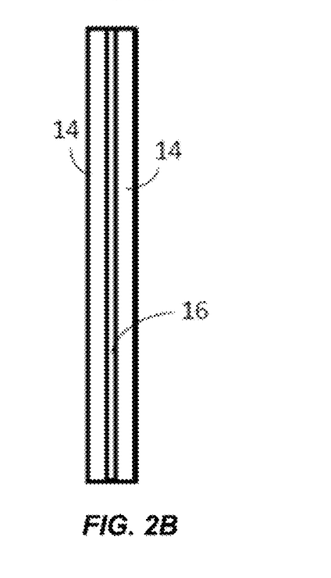
FIG. 2B is a cross section of the positive electrode taken along the line labeled B in FIG. 2A.

FIG. 2A and FIG. 2B illustrate a positive electrode. FIG. 2A is a sideview of the positive electrode. FIG. 2B is a cross section of the positive electrode taken along the line labeled B in FIG. 2A. The positive electrode includes a positive active medium 14 on both faces of a positive current collector 16. The positive active medium 14 includes one or more positive active materials. The positive current collector 16 provides an electrical pathway between the positive active medium 14 and a terminal of an electrochemical device. Although the positive active medium 14 is shown positioned on both faces of the positive current collector 16, the positive active medium 14 can be positioned on only one face of the positive current collector 16. The disclosed battery can be a primary or a secondary battery. As a result, the positive electrode can be the cathode of a primary battery or a secondary battery.

Suitable materials for the positive current collectors 16 include, but are not limited to, aluminum and steel. Suitable positive current collector 16 include, but are not limited to, a foil, net, mesh, or plate.

The positive active medium 14 includes, consists of, or consists essentially of one or more positive active materials.

The positive active material can be a crystalline active material with formula units that on average intercalate and/or deintercalate more than two charge carriers during operation of the battery. The positive active material can include octahedral structures that share a common atom. For instance, the octahedral structures can be arranged in bioctahedrons. In some instances, the octahedral structures share only one common atom. For instance, the octahedral structures can be arranged in bioctahedrons that share only a common vertex. In some instances, the octahedral structures are bridged by a tetrahedral structure such as $PO_4$. The formula units each include multiple screening ions. Each of the screening ions is included in one of the octahedral structures at a vertex opposite from the common atom included in the same octahedral structure. An axis extends between the screening ions included in a formula unit. More than three sodium charge carriers are located between the octahedral structures and around the axis. In some instances, the active material includes four charge carriers between the octahedral structures and around the axis.

An example of the positive active material has formula units represented by $Na_xV_{2-z}Q_z(PO_4)_2F_{3-2y}O_{2y}$, wherein Q is one or more components selected from a group consisting of metal and metalloid cations other than vanadium, $3 \leq x \leq 4$, $0 \leq y \leq 1$, $0 \leq z \leq 2$. When y is 0, z is >0 and when z is 0, x is >3. In some instances, Q represents more than one component selected from the group consisting of metal and metalloid cations and the subscript associated with each of the different components adds up to z. For instance, Q can represent a combination of aluminum and manganese in $Na_xAlMn(PO_4)_2F_{3-2y}O_{2y}$ where z has a value of 2. In one example, the positive active material is $Na_xV_2(PO_4)_2FO_2$ where $3 \leq x \leq 4$ such as $Na_4V_2(PO_4)_2FO_2$. In another example, the positive active material is $Na_xV_{2-z}Al_z(PO_4)_2F_3$ where $0 \leq z \leq 2$ and $3 \leq x \leq 4$ such as $Na_3V_{2-z}Al_z(PO_4)_2F_3$ with $0 \leq z \leq 2$. In a specific example, the positive active material is $Na_3V_{1.7}Al_{0.3}(PO_4)_2F_3$.

Figure 5:
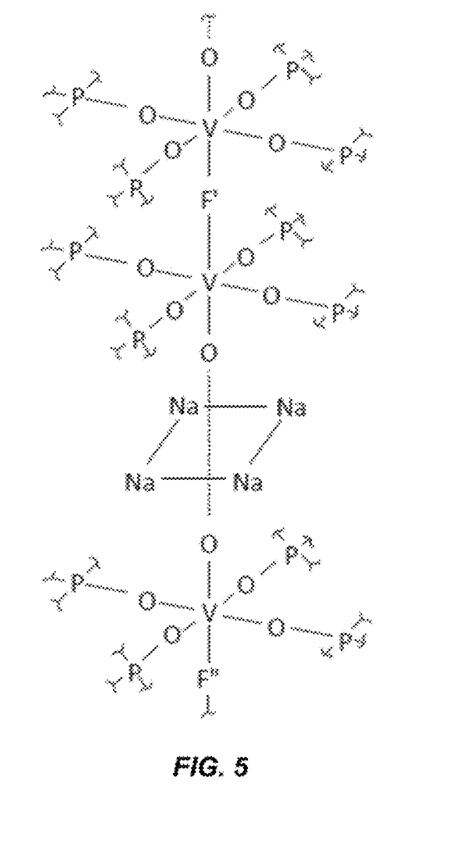
FIG. 5 shows the structure of $Na_4V_2(PO_4)_2FO_2$.

FIG. 5 illustrates the structure of $Na_4V_2(PO_4)_2FO_2$ as an example of active materials represented by $Na_xV_{2-z}Q_z(PO_4)_2F_{3-2y}O_{2y}$. The illustrated structure includes atoms from more than one formula unit. For instance, the fluorines represented by F' an F'' represents the corresponding atoms from two different formula units. The illustrated portion of the structure includes three octahedral structures that each includes vanadium as the central atom with four oxygens, a fluorine and oxygen as ligands. Although not evident from FIG. 5, the octahedral structures are bridged by $PO_4$ tetrahedra. Two of the octahedral structures share the fluorine labeled F' as the common atom. The third octahedral structure shares a fluorine labeled F''' as a common atom with an octahedral structure that is not illustrated.

In FIG. 5, the crystal formula units each include multiple screening ions. Each of the screening ions is included in one of the octahedral structures at a vertex opposite from a common atom included in the same octahedral structure. The dashed line shows an axis extending between the screening ions included in the same formula unit. The screening ions may be too far apart to be bonded or substantially to one another. As a result, the screening ions may not be bonded to one another. More than three sodium charge carriers are located between the octahedral structures and around the axis. For instance, FIG. 5 shows four sodium charge carriers between two of the octahedral structures and around the axis shown by the dashed lines.

When the positive active material is represented by $Na_xV_{2-z}Q_z(PO_4)_2F_{3-2y}O_{2y}$, with z>0, the one or more atom(s) represented by Q can each serve as a central atom in one of the octahedral structures. In some instances, Q is one or more redox-active transition metal cations. Examples of suitable redox-active transition metal cations include, but are not limited to, cations of the following transition metals: Ti, Cr, Mn, Fe, Co, Ni, Cu, Zn, Zr, Nb, Mo, Ru, Rh, Pd, Ag, Hf, Ta, W, Re, Os, Ir, Pt, and Au. In one or more alternate embodiments disclosed herein, Q is one or more redox-active basic metal cations. Examples of suitable basic metal cations include, but are not limited to, cations of the following basic metals: Al, Ga, In, Sn, and Bi. In a particular example, Q is an Al ion. In another example, Q is one or more redox-active metalloid cations. Examples of suitable redox-active metalloid cations include, but are not limited to, cations of the following basic metals: Si, Ge, and Sb.

The disclosed active materials such as $Na_xV_{2-z}Q_z(PO_4)_2F_{3-2y}O_{2y}$, show a surprisingly low volume change during operation of a battery. For instance, the active material shown a volume change that is less than 6.0%, 4.0% or even 2.0% and/or greater than 0.0% when intercalating at least three charge carriers and/or when deintercalating at least three charge carriers.

The positive active medium 14 can optionally include one or more components selected from the group consisting of one or more binders, one or more conductors and one or more diluents. Examples of suitable binders include, but are not limited to, polytetrafluoroethylene (PTFE), polyvinylidene fluoride (PVDF), hexafluoropropylene (HFP), styrene butadiene copolymers, and combinations of these binders. Examples of suitable conductors include, but are not limited to, carbon super P. In some instance, the positive electrode medium is 50 wt % to 95 wt % by weight of the positive active material.

The positive electrode can be generated by forming a slurry that includes the components of the positive medium and a solvent. The slurry is coated on one side the positive current collector 16 or on both sides of the positive current collector 16. The solvent can then be evaporated from the slurry so as to leave the positive medium on the positive current collector. The positive electrode can be cut out of the result.

Figure 3:
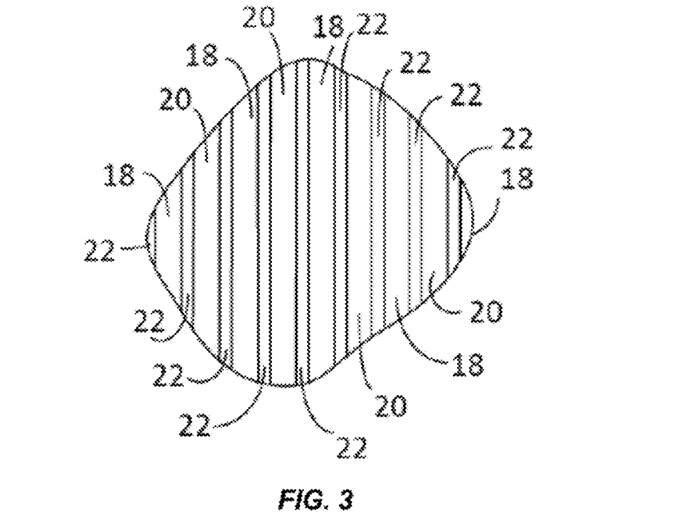
FIG. 3 is a cross section of a portion of an electrode assembly that includes positive electrodes constructed according to FIG. 1A through FIG. 1B and negative electrodes constructed according to FIG. 2A through FIG. 2B.

An electrode assembly includes one or more of the negative electrodes and one or more of the positive electrodes arranged in a stack or rolled together in a jellyroll configuration. When the electrode assembly includes multiple negative electrodes and multiple positive electrodes, the negative electrodes are alternated with positive electrodes. A separator is positioned between negative electrodes and positive electrodes that are adjacent to one another in the electrode assembly. For instance, FIG. 3 is a cross section of a portion of an electrode assembly. The electrode assembly includes negative electrodes 18 alternated with positive electrodes 20 and separators 22 positioned between the negative electrodes 18 and the positive electrodes 20 that are adjacent to each other.

Suitable separators for use in the electrode assembly include, but are not limited to, traditional separators such as Cellgard, glass fiber, polyolefins like polyethylene and polypropylene.

Figure 4:
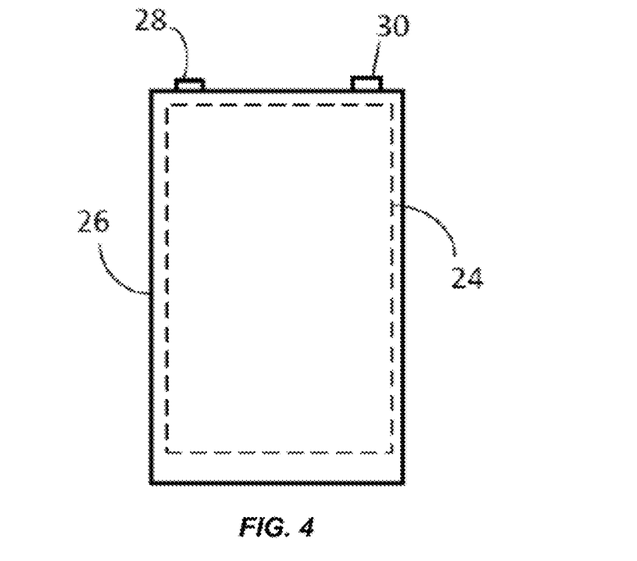
FIG. 4 illustrates a battery including an electrode assembly constructed according to FIG. 3.

A battery can include the electrode assembly 24 positioned in a case 26 as shown in FIG. 4. Although not illustrated in FIG. 4, the one or more negative electrodes in the electrode assembly can be in electrical communication with a first terminal 28 and the one or more negative electrodes in the electrode assembly can be in electrical communication with a second terminal 30. The battery can optionally include one or more insulators (not shown) positioned so as to prevent shorting in the battery.

The case can contain an electrolyte (not shown) that is positioned so as to activate the electrode assembly. For instance, the electrolyte can be positioned between the negative electrodes and the positive electrodes. Suitable electrolytes include, but are not limited to, liquid electrolytes, solid electrolytes, and gel electrolytes. Examples electrolytes include one or more salts dissolved in a solvent. Suitable solvents include, but are not limited to, organic solvents and combinations of organic solvents. Examples of suitable organic solvents include, but are not limited to, cyclic carbonates such as propylene carbonate (PC), ethylene carbonate (EC), butylene carbonate (BC) and vinylene carbonate (VC), linear carbonates such as dimethyl carbonate (DMC), diethyl carbonate (DEC), ethylmethyl carbonate (EMC) and dipropyl carbonate (DPC), dialkyl carbonates such as diglyme, trigylme, tetragylme, 1,2-dimethoxyethane (DME), methyl propyl carbonate, ethyl propyl carbonate, aliphatic carboxylate esters such as methyl formate, methyl acetate and ethyl propionate, gamma.-lactones such as γ-butyrolactone, linear ethers such as 1,2-ethoxyethane (DEE) and ethoxymethoxyethane (EME), cyclic ethers such as tetrahydrofuran and 2-methyltetrahydrofuran, and aprotic organic solvents such as dimethylsulfoxide, 1,3-dioxolane, formamide, acetoamide, dimethylformamide, dioxolane, acetonitrile, propylnitrile, nitromethane, ethylmonoglyme, triester phosphate, timethoxymethane, dioxolane-derivatives, sulphorane, methylsulphorane, 1,3-diemthyl-2-imidazoline, 3-methyl-2-oxazolidinone, propylene carbonate-derivatives, tetrahydrofuran-derivatives, ethylether, 1,3-propanesultone, anisole, N-methylpyrrolidone and fluorinated carboxylate esters.

Suitable salts for use with the electrolyte include, but are not limited to, $NaPF_6$, $NaClO_4$, NaTFSI, NaFSI and mixtures thereof.

The ability of the active material in the positive electrode to intercalate and/or deintercalate more than two charge carriers increases the gravimetric capacity and/or gravimetric energy density of the positive active material. For instance, the positive active material has a theoretical gravimetric energy density of greater than 500 Wh/kg and/or greater than 520 Wh/kg. In some instances, the battery has a theoretical gravimetric energy density between 500 Wh/kg and 600 Wh/kg. In these instances, the theoretical gravimetric energy density is determined by it integrating under the discharge curve in FIG. 7B. The area below the curve, so calculated, represents the energy density.

In some instances, the positive active material is generated from an underloaded active material that has a charge carrier level that is lower than is desired for use in the battery. For instance, an underloaded active material can be synthesized, obtained, or generated as $Na_3V_2(PO_4)_2FO_2$ when it is desired for the positive active material to include $Na_4V_2(PO_4)_2FO_2$ before the initial charge of the battery. The underloaded active material can be loaded with additional charge carrier using a variety of techniques including chemical techniques, electrochemical techniques and/or mechanochemical techniques. An example of a suitable mechanochemical technique includes milling the underloaded active material in the presence of additional charge carrier. For instance, the underloaded active material can be milled in the presence of additional sodium so as to generate a positive active material having the desired level of charge carrier.

Another example of loading an underloaded active material with additional charge carrier is to assemble the battery with a positive electrode that includes the underloaded active material in the positive active medium and also includes additional charge carrier in the negative electrode. For instance, when the battery is a sodium-ion battery, additional sodium can be present in the negative electrode. The negative electrode can include a carrier layer in addition to the negative active medium. The carrier layer can include or consist of the additional charge carrier. Alternately, the additional charge carrier can be included in the negative active medium. For instance, when the negative active medium is carbon and the battery is a sodium-ion battery, the negative active medium can include sodium and carbon in addition to any other components. In these instances, the amount of negative active material in the negative electrode is selected such that discharge of the battery before the initial charge of the battery would causes the underloaded active material to be loaded with the desired amount of charge carrier and accordingly convert the underloaded active material to desired positive active material. During operation of a battery assembled in this manner, the battery can be charged before the initial discharge of the battery or the initial discharge of the battery can be performed without an initial charge of the battery.

Another example of loading an underloaded active material with additional charge carrier is to assemble a precursor battery with a precursor positive electrode that includes the underloaded active material in the positive active medium and a negative electrode that includes the charge carrier. For instance, when the battery is a sodium-ion battery, the precursor battery can include sodium metal that acts as the negative electrode and/or as the negative active medium. The precursor battery can then be discharged until the underloaded active material is loaded with the desired amount of charge carrier and is accordingly converted to desired positive active material. The precursor positive electrode from the precursor battery can then be removed and the final battery assembled using the precursor positive electrode as the positive electrode or using the positive active material from the precursor positive electrode as the positive active material in the positive electrode of the desired battery. In this instance, the positive electrode in the desired battery will have a positive active material with the desired level of charge carrier loading before the initial charge and/or before the initial discharge of the battery.

Another example of loading an underloaded active material with additional charge carrier is to assemble the battery with a sacrificial salt. When the battery is a sodium-ion battery, an example of a suitable sacrificial salt is $NaBO_3$. During the first cycle of the battery, the salt decomposes and provides the additional charge carriers that are intercalated decomposes and provides the additional charge carriers that are intercalated by the positive active material. As a result, the battery can be discharged to a level that allows the positive active material to intercalate the additional charge carrier made available from the sacrificial salt.

The battery can be included in a system that includes electronics in electrical communication with the battery. The electronics can monitor and control discharge and/or charging of the battery. For instance, the electronics can stop discharge of the battery in response to the voltage of the battery falling below a voltage threshold. Suitable voltage thresholds include, but are not limited to, thresholds less than 2.0 V. Prior sodium-ion batteries were used with a voltage threshold above 2.0 V because below 2.0 V there was only a small gain in the battery capacity. However, the disclosed positive active materials can intercalate and/or deintercalate additional charge carriers at voltages below 2.0 V. Accordingly, discharging the battery to voltages below 2.0 V adds significant gravimetric capacity. Discharging the battery to voltages less than an electrolyte damage threshold can also damage the electrolyte as a result of electrolyte reduction. Accordingly, examples of voltage thresholds include, but are not limited to, thresholds less than 1.8 V, or 1.6V and/or greater than 1.0 V or 1.2 V.

Additionally, it may be possible for $Na_xV_2(PO_4)_2FO_2$ with $3<x\le4$ to intercalate and/or deintercalate more than 3 charge carriers when operating the battery at voltages above 4.4 V but these conditions may damage the electrolyte due to electrolyte oxidation. Accordingly, in some instances, the electronics can charge the battery to voltages above 4.4 V. As a result, in some instances, the electronics discharge the battery to voltages below 2.0 V and charge the battery above 4.4V. For instance, the electronics can stop discharge of the battery at voltages less than 2.0 and above 1.0 and stop charge of the battery at voltages above 4.4V and/or less than 6V or 5V.

Suitable electronics include, but are not limited to, firmware, hardware and software or a combination thereof. Examples of suitable electronics include, but are not limited to, analog electrical circuits, digital electrical circuits, processors, microprocessors, digital signal processors (DSPs), computers, microcomputers, ASICs, and discrete electrical components, or combinations suitable for performing the required control functions. In some instances, the electronics include one or more memories and one or more processing units such as a CPU. The one or more memories can include instructions to be executed by the processing unit during performance of the control and monitoring functions.

EXAMPLES

Example 1

$Na_3V_2(PO_4)_2F_3$ was synthesized by standard solid-state reaction between stoichiometric amounts of $VPO_4$ and NaF. $Na_3V_2(PO_4)_2FO_2$ was also synthesized by solid-state route by reacting stoichiometric amounts of $VPO_4$, $VOPO_4$, NaF and $Na_2CO_3$. $VPO_4$ was made by reduction of a stoichiometric mixture of $V_2O_5$ and $NH_4H_2PO_4$ under a hydrogen (2%)/argon atmosphere at 800° C. $VOPO_4$ was subsequently made by oxidation of $VPO_4$ fired in air at 700° C.

Positive electrodes for electrochemical characterization were prepared by mixing the active materials with carbon black and ball milling them for 30 minutes in a Fritsh Pulverisette, followed by addition of PTFE as binder. The overall electrode composition was 80 wt % active material, 16 wt % carbon, and 4 wt % PTFE. Standard 2032 coin cells were assembled in an argon-filled glovebox, using 1M $NaPF_6$ in EC:DEC as electrolyte and sodium metal as the negative electrode. Positive electrode loadings were typically 10 mg/cm$^2$. First coin cells included the $Na_3V_2(PO_4)_2F_3$ as the positive active material while second coin cells included the $Na_3V_2(PO_4)_2FO_2$ as the positive active material.

Figure 6:
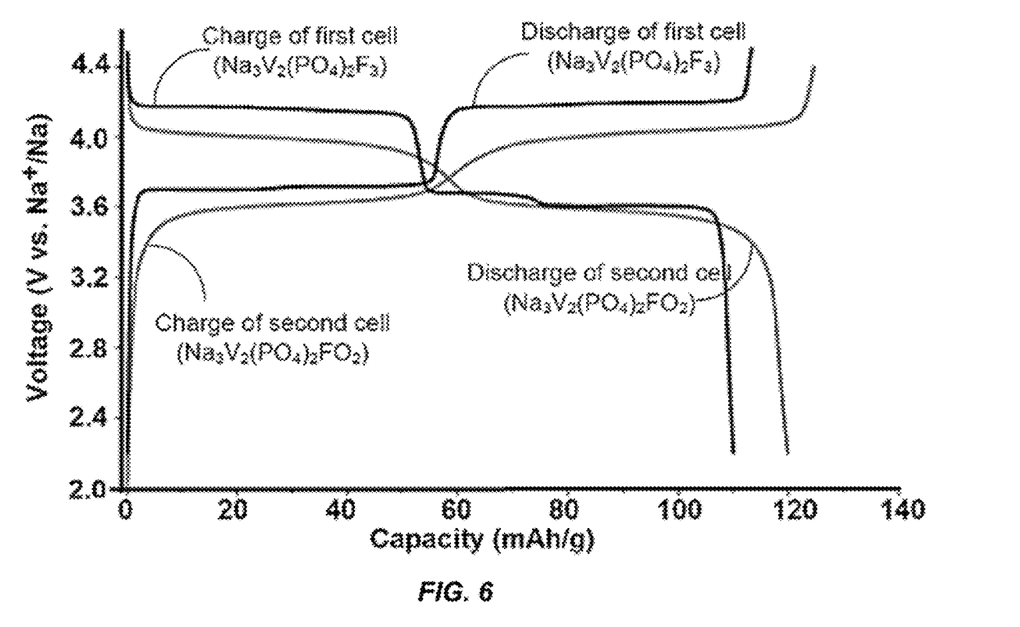
FIG. 6 is a graph of voltage versus capacity for different coin cells.

Electrochemical tests were conducted on an Arbin instrument. The first coin cells and the second coin cells were cycled between 2.2 and 4.5 V at C/10 rate. The resulting charge curve and discharge curves for the first coin cells and the second coin cells are shown in FIG. 6. Since the first coin cells and the second coin cells were not discharged below 2.0 V, FIG. 6 represents a typical cycling voltage for a sodium-ion battery.

Figure 7A:
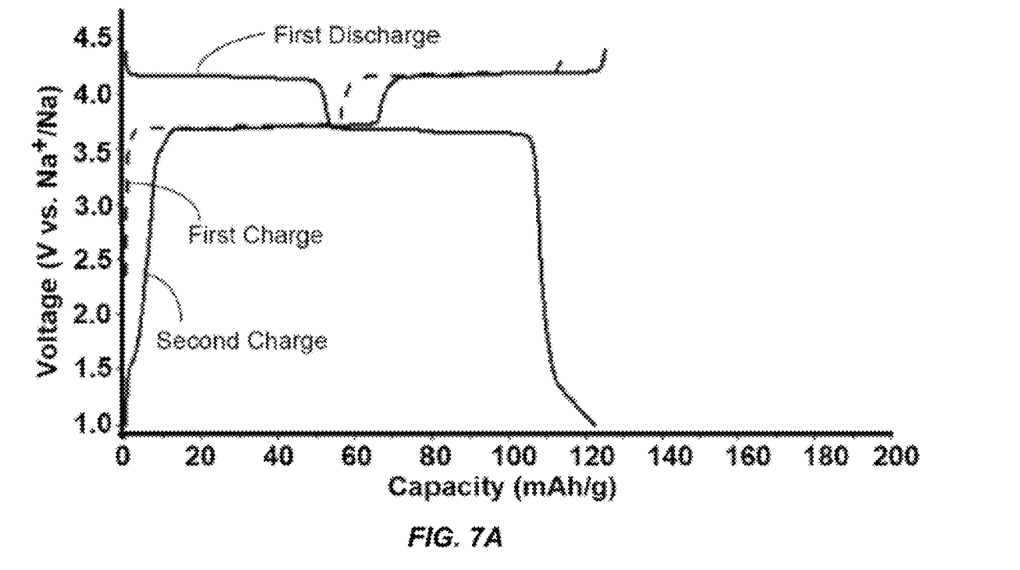
FIG. 7A is a graph of voltage versus capacity for coin cells with an electrode that includes $Na_xV_2(PO_4)_2F_3$.

The first coin cells were also cycled between 1.0 and 4.4 V at a C/20 rate. FIG. 7A shows curves for the first charge, the first discharge and the second charge of the first coin cells. During the first charge, the first coin cells were charged between 2.3V and 4.4V. During the first discharge and the second charge, the first coin cells were cycled between 1.0V and 4.4V.

Figure 7B:
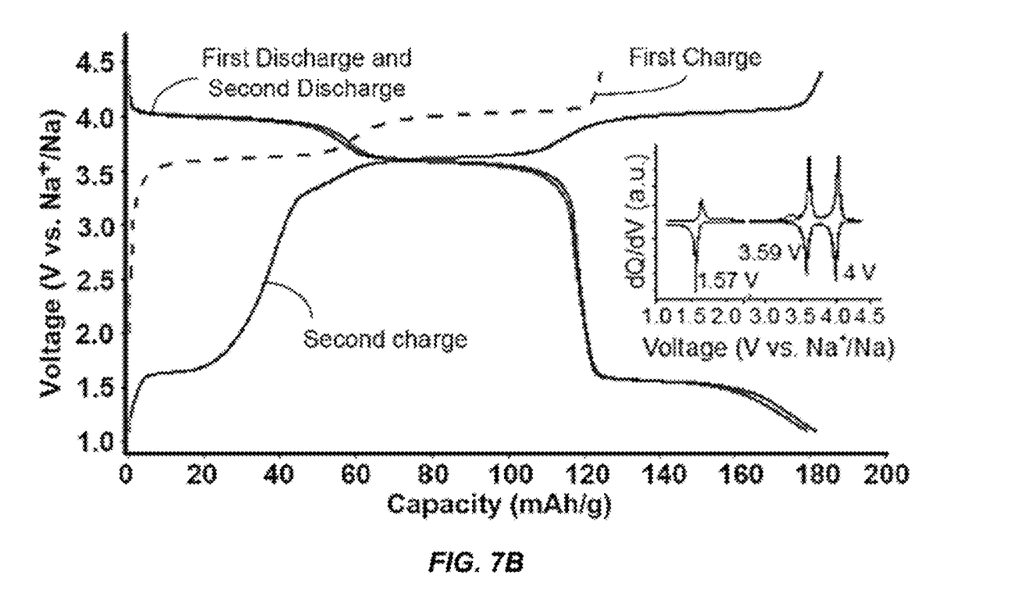
FIG. 7B is a graph of voltage versus capacity for coin cells with an electrode that includes $Na_xV_2(PO_4)_2FO_2$.

The second coin cells were also cycled between 1.0 and 4.4 V at a C/20 rate. FIG. 7B shows curves for the first charge, the first discharge and the second charge of the second coin cells. During the first charge, the second coin cells were cycled between 2.0V and 4.4V. During the first discharge and the second charge, the first coin cells were cycled between 1.1V and 4.4V.

FIG. 7B shows that the second coin cells experience of voltage plateau at about 1.57 V that is not present in FIG. 7A. This voltage plateau is consistent with an additional charge carrier intercalating and deintercalating from the $Na_3V_2(PO_4)_2FO_2$ during the operation of the second coin cells. More particularly, the voltage plateau is consistent with the $Na_3V_2(PO_4)_2FO_2$ taking up additional charge carriers so as to move toward or become $Na_4V_2(PO_4)_2FO_2$ during the discharge of the second coin cells and giving up additional charge carriers during the charge of the second coin cells. Accordingly, FIG. 7B shows that $Na_xV_2(PO_4)_2FO_2$ with $3<x\le4$ can intercalate and/or deintercalate more than 2 charge carriers and/or up to 3 charge carriers when operating the battery between 1.1V and 4.4V. Additionally, it may be possible for $Na_xV_2(PO_4)_2FO_2$ with $3<x\le4$ to intercalate and/or deintercalate more than 3 charge carriers when operating the battery at voltages above 4.4 V but these conditions may damage the electrolyte due to electrolyte oxidation.

The voltage plateau that is evident in FIG. 7B is not shown in FIG. 7A because the $Na_3V_2(PO_4)_2F_3$ does not intercalate and/or deintercalate more than 2 charge carriers during the operation of the first coin cells. In the first coin cells, the screening ions are $F^-$ while in the second coin cells the screening ions are $O^{2-}$. Accordingly, the charge carriers (sodium) are screened by $F^-$ in the first coin cells and by $O^{2-}$ in the second coin cells. It is believed that the stronger screening effect of the $O^{2-}$ anions provides increased weakening of the electrostatic repulsion between the $Na^+$ ions and permits the additional charge carrier to intercalate and/or deintercalate from the $Na_3V_2(PO_4)_2FO_2$.

The voltage plateau that is evident in FIG. 7B is also not evident for the second coin cells shown in FIG. 6 because the second coin cells are not discharged to a voltage where the intercalation and/or deintercalation of the third charge carrier occurs. As is evident from FIG. 7A, discharging the first coin cells to voltages below 2.0V provides very little additional capacity. In contrast, FIG. 7B shows that discharging the second coin cells to voltages below 2.0V provides a significant increase in capacity.

The original positive active material in the positive electrode of the second coin cells is $Na_3V_2(PO_4)_2FO_2$. Since the positive active material moved from $Na_3V_2(PO_4)_2FO_2$ toward $Na_4V_2(PO_4)_2FO_2$ during operation of the second coin cells, the second coin cells includes a source of additional charge carrier. For instance, the negative electrode in the first coin cells and the second coin cells was sodium metal that served as the source of the additional charge carriers during discharge of the second coin cells. Accordingly, the $Na_3V_2(PO_4)_2FO_2$ acted as an underloaded active material that was loaded with additional charge carrier during discharge of the second coin cells.

Since the second cells load additional charge carrier into an underloaded active material, the second coin cells can serve as precursor batteries. For instance, the positive electrodes having the $Na_3V_2(PO_4)_2FO_2$ loaded with additional charge carrier so as to be $Na_xV_2(PO_4)_2FO_2$ with $3<x\le4$ can be removed from the second coin cells and the resulting positive active material subsequently included in another battery as a positive active material. For instance, after a discharge of the second coin cells to a voltage below 1.57 V, the positive electrodes can be removed from the second coin cells and used as a positive electrode in a different battery.

Example 2

Figure 8:
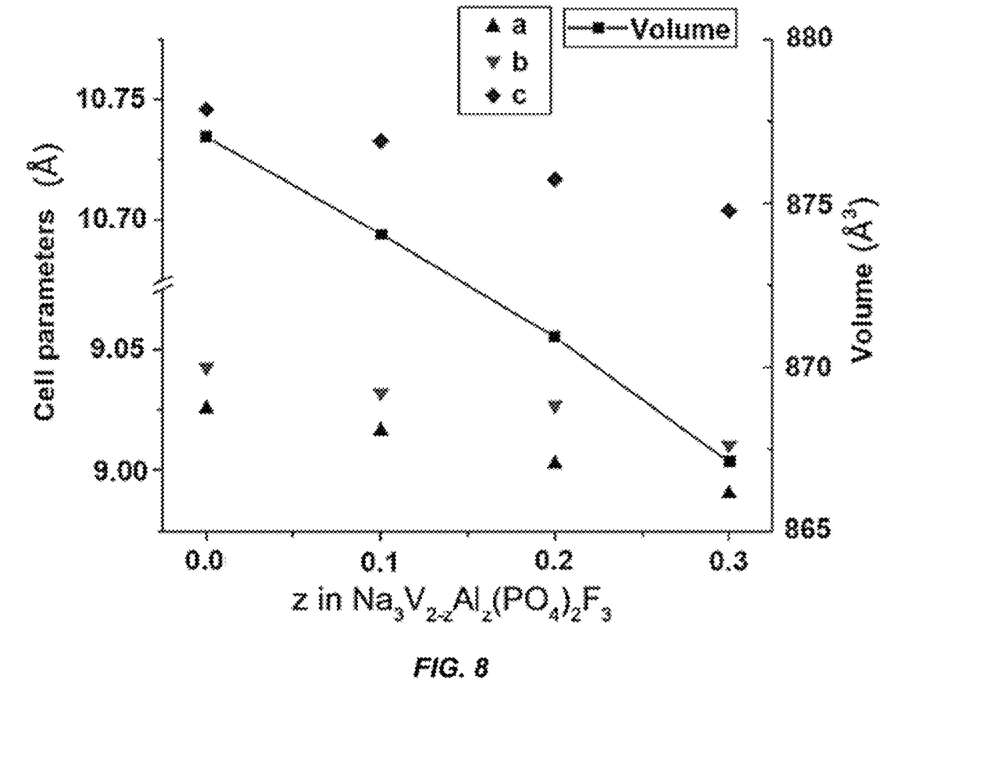
FIG. 8 is a graph showing various cell parameters as a function of z in $Na_3V_2(PO_4)_2F_3$.

$Na_3V_{2-z}Al_z(PO_4)_2F_3$ was synthesized for z=0, 0.1, 0.2, 0.3. The $Na_3V_{2-z}Al_z(PO_4)_2F_3$ was synthesized by standard solid state reaction between stoichiometric amounts of $VPO_4$, $AlPO_4$ (Sigma) and NaF. The substitution of Al for the V was confirmed by the steady decrease in formula unit parameters for increasing z as shown in Table 1 and FIG. 8. Consistent with the smaller ionic radius of $Al^{3+}$ as compared to $V^{3+}$ (0.54 Å vs. 0.64 Å), the formula unit decreased from 877 Å$^3$ (z=0) to 867 Å$^3$ (z=0.3). Substitution aluminum for vanadium may have the beneficial effect of increasing the gravimetric capacity of the material.

Negative Electrodes for electrochemical characterization were prepared by mixing the active materials ($Na_3V_{2-z}Al_z(PO_4)_2F_3$ with z=0, 0.1, 0.2, 0.3) with carbon black and ball milling them for 30 minutes in a Fritsh Pulverisette, followed by addition of PTFE as binder. The overall electrode composition was 80 wt % active material, 16 wt % carbon, and 4 wt % PTFE. Third coin cells (standard 2032 coin cells) were assembled in an argon-filled glovebox, using 1M $NaPF_6$ in EC:DEC as the electrolyte and sodium metal as the negative electrode. Positive electrode loadings were typically 10 mg/cm$^2$.

Figure 9:
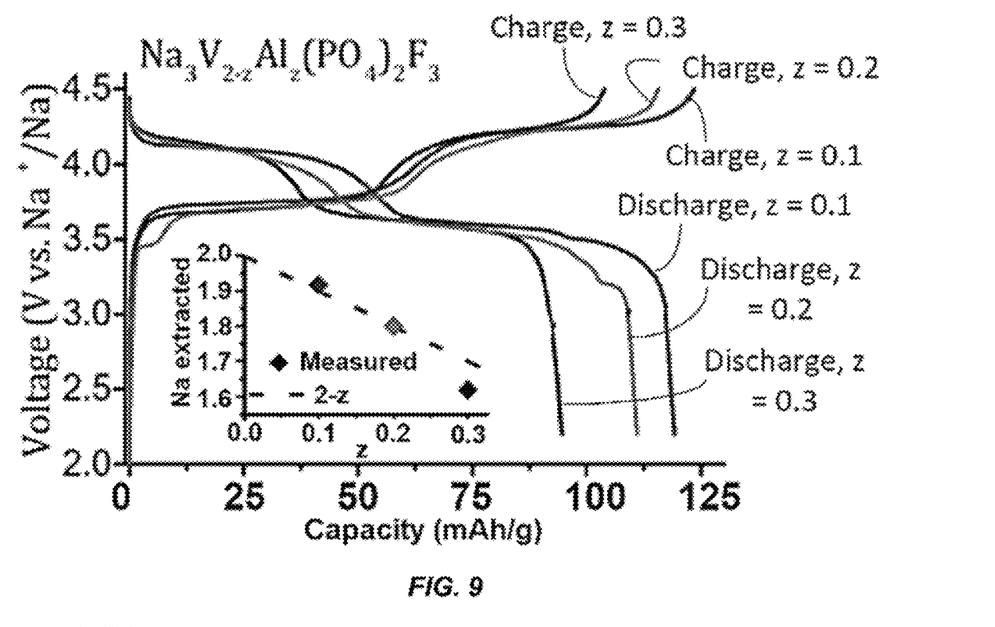
FIG. 9 is a graph of voltage versus capacity for coin cells with an electrode that includes $Na_3V_{2-z}Al_z(PO_4)_2F_3$.

Electrochemical tests were conducted on an Arbin instrument. The third coin cells and the second coin cells were cycled between 2.2 and 4.5 V at C/10 rate. FIG. 9 shows a resulting charge curve and a resulting discharge curves for third coin cells that include $Na_3V_{2-z}Al_z(PO_4)_2F_3$ with z=0.1, third coin cells that include $Na_3V_{2-z}Al_z(PO_4)_2F_3$ with z=0.2, and third coin cells that include $Na_3V_{2-z}Al_z(PO_4)_2F_3$ with z=0.3. The third coin cells were not discharge below 2.0 V.

Figure 10:
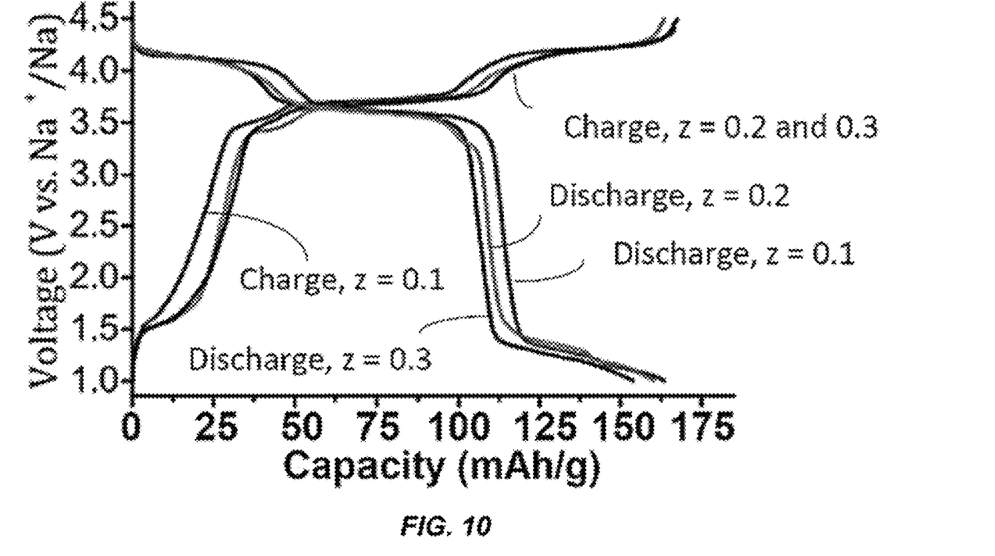
FIG. 10 is another graph of voltage versus capacity for coin cells with an electrode that includes $Na_3V_{2-z}Al_z(PO_4)_2F_3$.

The third coin cells and the second coin cells were also cycled between 1.0 and 4.4 V at C/10 rate. FIG. 10 shows a resulting charge curve and a resulting discharge curves for third coin cells that include $Na_3V_{2-z}Al_z(PO_4)_2F_3$ with z=0.1, third coin cells that include $Na_3V_{2-z}Al_z(PO_4)_2F_3$ with z=0.2, and third coin cells that include $Na_3V_{2-z}Al_z(PO_4)_2F_3$ with z=0.3.

FIG. 10 shows that the third coin cells experience of voltage plateau at 1.3 V. This voltage plateau is consistent with an additional charge carrier intercalating and deintercalating from the $Na_3V_{2-z}Al_z(PO_4)_2F_3$ during the operation of the third coin cells. More particularly, the voltage plateau is consistent with the $Na_3V_{2-z}Al_z(PO_4)_2F_3$ taking up additional charge carriers so as to move toward or become $Na_4V_{2-z}Al_z(PO_4)_2F_3$ during the discharge of the battery and giving up additional charge carriers during the charge of the battery. Accordingly, FIG. 10 shows that $Na_xV_{2-z}Al_z(PO_4)_2F_3$ with z>0 and 3<x≤4 can intercalate and/or deintercalate more than 2 charge carriers and/or up to 3 charge carriers when operating the battery between 1.0V and 4.4V.

Example 3

Figure 11:
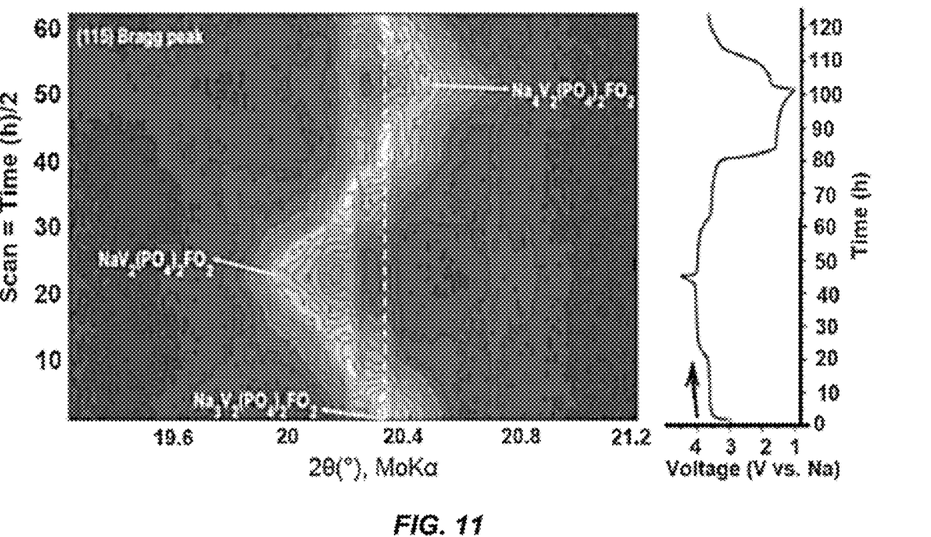
FIG. 11 is a contour plot for $Na_xV_2(PO_4)_2FO_2$.
Figure 12:
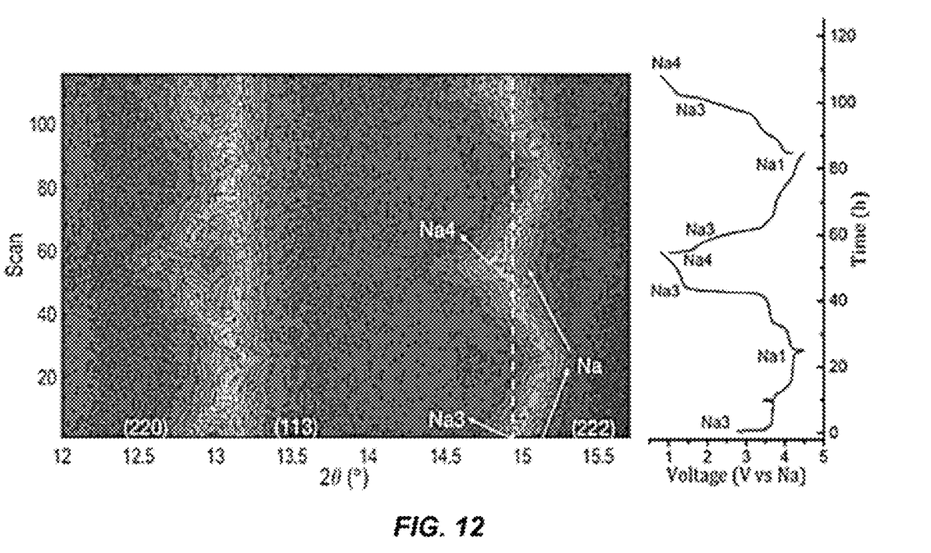
FIG. 12 is a contour plot for $Na_xV_{1.9}Al_{0.1}(PO_4)_2F_3$.

An operando X-Ray diffraction was conducted on a Rigaku diffractometer, in Bragg-Brentano geometry using Cu Kα radiation during a full electrochemical cycle. FIG. 11 is a contour plot for $Na_xV_2(PO_4)_2FO_2$ and FIG. 12 is a contour plot for $Na_xV_{1.9}Al_{0.1}(PO_4)_2F_3$. FIG. 11 shows the evolution of the (115) Bragg peak upon sodium extraction (to $NaV_2(PO_4)_2FO_2$), reinsertion (to $Na_4V_2(PO_4)_2FO_2$), and final extraction to regain the initial $Na_3V_2(PO_4)_2FO_2$, proving the reversibility of the intercalation reaction. A sequence of biphasic reactions are thought to occur upon charge and discharge of these materials, with intermediate Na-ordered phases typical of this class of compounds. At least two biphasic reactions upon both charge and discharge can be distinguished, separated by the intermediate composition $Na_2V_2(PO_4)_2FO_2$ with the biphasic reactions characterized by peaks losing intensity and new peaks concurrently gaining intensity at a different 2θ position, as opposed to the continuous peak shift one would observe for a solid solution reaction mechanism. A profile-matching refinement (LeBail fit) was used to determine the cell parameters of significant compositions: for the desodiated end-member $NaV_2(PO_4)_2FO_2$, it was found in the P4$_2$/mnm space group, a=b=8.904(3) Å, c=10.805(3) Å, V=856.7(4) Å$^3$. This gives a relative volume contraction upon charge of ΔV/V=−0.7% with respect to the pristine compound.

Table 1 shows formula unit parameters of the synthesized $Na_3V_{2-z}Al_z(PO_4)_2F_3$ (z=0, 0.1, 0.2, 0.3) and $Na_xV_2(PO_4)_2FO_2$ (x=3, 1, 4). Parameters are obtained from LeBail fit of X-Ray diffraction data, using the Amam space group for all $Na_3V_{2-z}Al_z(PO_4)_2F_3$, and P4$_2$/mnmfor $Na_3V_2(PO_4)_2FO_2$. Data obtained from operando experiment marked with *.

TABLE 1

| Material | a [Å] | b [Å] | c [Å] | Vol[Å$^3$] |
|---|---|---|---|---|
| $Na_3V_2(PO_4)_2F_3$ | 9.025(1) | 9.043(1) | 10.746(1) | 877.0(1) |
| $Na_3V_{1.9}Al_{0.1}(PO_4)_2F_3$ | 9.016(1) | 9.032(1) | 10.732(1) | 874.0(1) |
| $Na_3V_{1.8}Al_{0.2}(PO_4)_2F_3$ | 9.002(3) | 9.026(3) | 10.716(3) | 870.9(3) |
| $Na_3V_{1.7}Al_{0.3}(PO_4)_2F_3$ | 8.990(1) | 9.010(1) | 10.704(1) | 867.1(2) |
| $Na_3V_2(PO_4)_2FO_2$ | 9.012(1) | 9.012(1) | 10.627(2) | 863.1(2) |
| $NaV_2(PO_4)_2FO_2$* | 8.904(3) | 8.904(3) | 10.805(3) | 856.7(4) |
| $Na_4V_2(PO_4)_2FO_2$* | 9.092(3) | 9.092(3) | 10.549(3) | 872.0(4) |

The cell parameters variation is anisotropic: a and b shrink upon sodium extraction, while c increases, resulting in a small overall volume variation. Upon Na insertion, the end-member $Na_4V_2(PO_4)_2FO_2$ was observed for the first time, which appears through a biphasic reaction, consistent with the flat electrochemical curve. The formula unit parameters that were retrieved from the operando data are: a=b=9.092(3) Å, c=10.549(3) Å, V=872.0(4) Å$^3$. This shows a very low formula unit expansion of only ΔV/V=+1% upon insertion of the 4th sodium. Notably, this means an overall volume variation during the exchange of 3 sodium ions of |ΔV|/V=1.7%. This value is significantly smaller than the one potentially obtainable for $Na_3V_2(PO_4)_2F_3$, which upon charge contracts by −3%, and during discharge to $Na_4V_2(PO_4)_2F_3$ expands further by +3.2%, for a total variation |ΔV|/V=6.2%.

Figure 13:
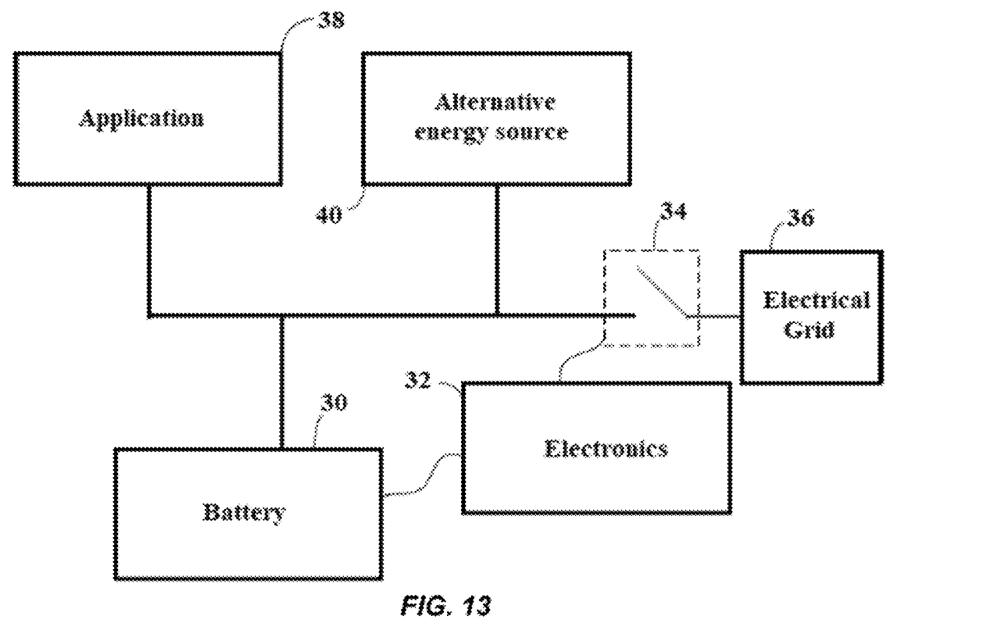
FIG. 13 is a block diagram of a grid that includes a battery according to the disclosure.

The battery is suitable for a variety of applications including, but not limited to, grid applications. FIG. 13 presents an example of a grid system that includes the battery 30. The battery 30 is in electrical communication with electronics 32 that monitor and control discharge and/or charging of the battery 30. The electronics 32 can operate a switch 34 to disconnect so as to place the battery 30 in electrical communication with a traditional centralized electrical grid 36 (macrogrid) such that the grid 36 can charge the battery and/or receive electrical energy form the battery 36. Alternately, the electronics 32 can disconnect the battery from the grid 36. The battery 30 is also in electrical communication with an application 38 to which the battery provides electrical energy. An example application 38 is a home to which the battery provides electrical power. In some instances, the battery 30 is also in electrical communication with an alternative energy source 40 such as a wind, solar, and/or hydroelectric power source. Electrical energy from the alternative energy source 40 and/or the grid 36 can be used to charge the battery and store electrical energy for use by the application 38.

The invention claimed is:

1. A sodium-ion battery, comprising:
an electrode having a crystalline active material with formula units $Na_xV_2\text{-}z\,Q_z(PO_4)_2F_{3-2y}O_{2y}$ that intercalates and/or deintercalates an average of more than two charge carriers during operation of the battery, wherein Q does not represent vanadium and is one or more components selected from a group consisting of redox-active metal cations and metalloid cations;
$3 \leq x \leq 4$;
$0 \leq y \leq 1$;
$0 \leq z < 2$;
when z is 0, x is >3; and
when y is 0, z is >0.

2. The battery of claim 1, wherein z is 0 and x is >3.

3. The battery of claim 1, wherein the active material is represented by $Na_4V_2(PO_4)_2FO_2$.

4. The battery of claim 1, wherein the active material represented by $Na_xV_{2-z}Q_z(PO_4)_2F_{3-2y}O_{2y}$ is present in the electrode before the initial charge of the battery.

5. The battery of claim 1, wherein z is >0.

6. The battery of claim 4, wherein x is >3.

7. The battery of claim 1, wherein the active material is represented by $Na_xV_{2-z}Al_z(PO_4)_2F_3$ where $0 \leq z < 2$ and $3 \leq x \leq 4$.

8. The battery of claim 1, wherein the active material is represented by $Na_3V_{2-z}Al_z(PO_4)_2F_3$ with $0 \leq z < 2$.

9. The battery of claim 1, wherein the electrode is a positive electrode or a cathode.

10. The battery of claim 1, wherein the active material multiple octahedral structures that share a common atom, the formula units each includes multiple screening ions, each of the screening ions is included in one of the octahedral structures at a vertex opposite from the common atom that is included in the same octahedral structure, an axis extends between the screening ions in the same formula unit, more than three sodium charge carriers are located between the octahedral structures and around the axis.

11. The battery of claim 10, wherein at least one of the screening ions is an oxygen anion ($O^{2-}$).

12. The battery of claim 10, wherein each of the screening ions is an oxygen anion.

13. The battery of claim 12, wherein at least one of the octahedral structures has a central atom that is not vanadium and is selected from a group consisting of metals and metalloid cations.

14. The battery of claim 10, wherein the octahedral structures share only one common atom.

15. The battery of claim 1, wherein the active material experiences a volume change of less than 6% when intercalating more than two charge carriers.

16. The battery of claim 15, wherein the active material experiences a volume change of less than 4% when intercalating three charge carriers.

17. A sodium ion battery, comprising: an electrode having an active material represented by $Na_xV_{2-z}Q_z(PO_4)_2F_{3-2y}O_{2y}$, wherein
Q is selected from Al, Ga, In, Sn, and Bi;
$3 \leq x \leq 4$;
$0 \leq y \leq 1$;
$0 \leq z < 2$;
when z is 0, x is >3; and
when y is 0, z is >0.

18. A system, comprising:
a sodium-ion battery comprising an electrode having an active material represented by $Na_xV_{2-z}Al_z(PO_4)_2F_3$, wherein
$0 \leq z < 2$;
$3 \leq x \leq 4$; and
electronics for controlling the discharge of the battery such that the battery is discharged to a voltage less than 2.0 V or less than 1.8 V.

19. The sodium-ion battery of claim 1, wherein the electrode has an energy density greater than 500 Wh/kg.

\* \* \* \* \*